Patented Oct. 4, 1938

2,132,019

UNITED STATES PATENT OFFICE 2,132,019

INHIBITION OF PEROXIDE FORMATION IN ALIPHATIC ETHERS

Theodore Evans, Berkeley, Calif., assignor to Shell Development Company, San Francisco, Calif., a corporation of Delaware No Drawing. Original application August 19, 1936, Serial No. 96,816. Divided and this application May 3, 1938, Serial No. 205,755

10 Claims. (Cl. 23—250)

This invention relates to the stabilization of aliphatic ethers and it more particularly relates to a method of inhibiting the formation of oxidative impurities, as peroxides, in aliphatic ethers, particularly aliphatic mixed and aliphatic symmetrical isoethers. The invention also relates to stabilized compositions consisting of or comprising aliphatic mixed and aliphatic symmetrical isoethers.

The aliphatic ethers, particularly the mixed ethers and symmetrical isoethers, when stored under ordinary storage conditions, even in glass containers, undergo considerable deterioration whereby the ether is contaminated with oxidative and other decomposition products which materially decrease its value for many commercial purposes. In some cases, due to their high peroxide content, further treatment, as distillation, of the stored ether or ether composition is hazardous. The ethers on standing usually deteriorate by reacting with oxygen to form peroxides, which in turn by interaction and/or spontaneous decomposition may yield other deleterious impurities, the removal of which is in many cases a difficult and costly proceeding. The impurities formed in the aliphatic mixed ethers and the aliphatic symmetrical isoethers by spontaneous deterioration or auto-oxidation when such ethers are stored or shipped alone or in admixture with one or more other materials, may for convenience be termed "oxidative impurities", which term is intended to embrace peroxides and related contaminating impurities. The deterioration of the aliphatic mixed and aliphatic symmetrical isoethers increases with lapse of time and is usually favored by: the presence of oxygen in the storage or shipping container; the presence, as is usual, of dissolved oxygen in the ether as manufactured; expose to light, particularly direct sunlight; exposure to heat; exposure to air; exposure to pressure and the like.

It is an object of my invention to provide a practical and highly effective method for substantially inhibiting the formation of peroxides and other deleterious impurities in the ethers to which this invention relates when the same, either in the pure state or in admixture with other materials as hydrocarbons and the like, are stored, shipped or used for purposes where a stable ether or ether-containing mixture substantially free of peroxides is desired.

It is another object of my invention to provide novel and useful compositions which are substantially stabilized against deterioration and peroxide formation and which consist of or comprise one or more aliphatic mixed ethers and/or one or more aliphatic symmetrical isoethers. These stabilized compositions may be stored for relatively long periods of time and they may be shipped for great distances, in the conventional containers, without substantial peroxide formation or deterioration of the ether content of the composition. The stabilized compositions are useful for a wide variety of purposes, and they are useful as raw materials in the production of a wide variety of products.

The process of my invention comprises incorporating with the ether to be stabilized, or with the mixture comprising one or more of such ethers, by mixing or any other suitable means, a stabilizing amount of an organic carbonylic compound of the class consisting of ketones and carboxylic acids. By the term "stabilizing amount", I mean an amount of an organic carbonylic compound or mixture of such compounds effective to stabilize the ether content of the treated material against deterioration, for example, against auto-oxidation resulting in peroxide formation.

The ethers stabilized in accordance with the invention are members of the class of ethers consisting of aliphatic mixed ethers and aliphatic symmetrical isoethers. The aliphatic mixed ethers are ethers wherein two different aliphatic radicals are linked to an ether oxygen atom. The different aliphatic radicals may be straight chain radicals or branched chain radicals or one may be straight chain and the other branched. The radicals may be the residues of aliphatic normal- or iso-primary or secondary alcohols or they may be the radicals of aliphatic tertiary alcohols. The simplest aliphatic mixed ether is methyl ethyl ether. Other readily available aliphatic mixed ethers are methyl propyl ether, methyl isopropyl ether, methyl normal butyl ether, methyl tertiary butyl ether, methyl amyl ether, methyl secondary amyl ether, methyl tertiary amyl ether, methyl hexyl ether, methyl tertiary hexyl ether, ethyl propyl ether, ethyl isopropyl ether, ethyl normal butyl ether, ethyl secondary butyl ether, ethyl tertiary butyl ether, ethyl amyl ether, ethyl secondary amyl ether, ethyl tertiary amyl ether, the ethyl hexyl ethers, the propyl butyl ethers, the propyl amyl ethers and the like. The homologues, analogues and substitution products of the above, as well as mixed ethers wherein one or both of the aliphatic radicals is/are unsaturated, as for example ethyl isobutenyl ether, allyl isobutenyl ether, ethyl isopentenyl ether and the like, may be stabilized in accordance with the invention. The aliphatic mixed ethers possessing a methyl group linked to an ether oxygen atom as the methyl butyl ethers, etc. are usually more stable than the higher mixed ethers possessing radicals containing at least two carbon atoms. Under some conditions, the former may be sufficiently stable and may not require stabilization. However, the latter, are very susceptible to auto-oxidation and must be stabilized if excessive peroxide formation is to be avoided when they are stored for even relatively short periods of time.

In the aliphatic symmetrical isoethers, the aliphatic radicals linked to the ether oxygen atom are identical, and the compound forms a chain at least doubly branched. The aliphatic radicals are the radicals of aliphatic isoprimary alcohols, normal- or iso-secondary alcohols or tertiary alcohols. The simplest aliphatic symmetrical isoether is diisopropyl ether, which compound is particularly susceptible to auto-oxidation with the formation of peroxides. After standing for a short period of time, diisopropyl ether usually contains sufficient peroxide to render its purification by distillation, without a previous treatment to destroy the peroxide, extremely hazardous due to dangers of explosion.

Other readily available aliphatic symmetrical isoethers are: diisobutyl ether, disecondary butyl ether, ditertiary butyl ether, diisoamyl ether, the disecondary amyl ethers, the ditertiary amyl ethers, diisohexyl ether and the like and their homologues, analogues and substitution products. The aliphatic unsaturated symmetrical isoethers as diisobutenyl ether, diisopentenyl ether, disecondary pentenyl ether and the like may be stabilized in accordance with the invention.

The ether stabilizing agents or peroxide-formation inhibiting agents used in accordance with the invention are carbonylic compounds, particularly carbonylic compounds of the class consisting of the ketones and carboxylic acids. A suitable carbonylic compound of this preferred class may be saturated or unsaturated and it may be of aliphatic, aralkyl or alicyclic character and possess one or a plurality of carbonyl groups.

Suitable representative carbonylic compounds are the following: the ketones as acetone, methyl propyl ketone, methyl ethyl ketone, diethyl ketone, dipropyl ketone, methyl propenyl ketone, acetophenone, benzophenone, benzylideneacetone, benzylidinacetophenone, diacetyl, acetyl acetone, acetophenoneacetone, pyruvic acid, aceto-acetic acid, laevulic acid and the like; the mono- and polycarboxylic acids as formic, acetic, propionic, butyric, isobutyric, valeric, acrylic, oxalic, malonic, succinic, glutaric, adipic, pimelic, suberic, maleic, fumaric, tartronic, malic, tartaric, benzoic, phenyl acetic, the toluic acids, hydrocinnamic, hydratropic, the toyl-acetic acids, the ethyl-benzoic acids, mesitylenic, salicylic, hydroxy-benzoic, anisic, mandelic, tropic, cinnamic, atropic, phenyl-propiolic, coumaric and the like and their homologues, analogues and suitable substitution products.

Satisfactory results have been obtained when the carbonylic inhibiting agent is used in an amount equal to about 0.004 mol. of inhibitor per liter of ether stabilized. However, the invention is not limited to the use of any specific proportion of the inhibitor. In some cases, the presence of the carbonylic compound in a concentration equal to about 0.001% by weight of the ether content of the material to be stabilized may be effective; in other cases, it may be desirable to use as much as 10% or more of the stabilizing agent.

The amount of the inhibitor to be used will usually be dependent upon the particular stabilizing agent, upon the particular ether or ether combination to be stabilized and upon the conditions to which the stabilized material will be subjected. In many cases, carbonylic compounds of the class consisting of ketones and carboxylic acids have the desired effectiveness when employed in concentrations of from about 0.002% to about 2% by weight of the ether content of material stabilized.

If desired, the stabilizing agent employed may comprise a mixture of carbonylic compounds. The carbonylic stabilizing material may be added to the ether or ether-containing material to be stabilized in any desired manner. A carbonylic compound may be added per se or dissolved or suspended in a suitable media. It may be desirable to select the carbonylic stabilizing agent with respect to the ether or ether composition to be stabilized so that the former is soluble to the desired extent in the latter. It may, in some cases, be desirable to select the specific inhibitor material with respect to the material stabilized so that it may, if desired, be subsequently separated therefrom by some convenient means as distillation, extraction, etc.

The material stabilized may consist of one or more aliphatic ethers of the class consisting of the aliphatic mixed ethers and aliphatic symmetrical isoethers. The invention also embraces within its scope the stabilization against deterioration and peroxide formation of the ether content of mixtures comprising one or more of such ethers in substantial amount. The ether or ethers may be in admixture with one or more solvents or diluents as the following: the aromatic and aralkyl hydrocarbons as benzene, toluene, xylene, cymene, ethyl benzene, etc.; the alicyclic hydrocarbons as cyclohexane, tetrahydrobenzene, etc.; the saturated as well as unsaturated aliphatic hydrocarbons; the hydrocarbon mixtures as gasoline, kerosene, Diesel oil, fuel oil, lubricating oil, etc.; halogenated hydrocarbons; and various oxy compounds as alcohols and the like.

To measure the rate of peroxide formation in some readily available aliphatic mixed ethers and aliphatic symmetrical isoethers on storage, and to demonstrate the effectiveness of representative carbonylic compounds in inhibiting peroxide formation, a series of tests were made, the results of which are given in the following examples. It is to be understood that the examples are for purposes of illustration; the invention is not to be regarded as limited to the specific ethers stabilized nor to the specific carbonylic compounds recited.

*Example I*

Two samples of about the same volume were drawn from a freshly prepared stock of ethyl tertiary butyl ether and placed in glass sample bottles. One of the samples was left untreated; the other sample was stabilized by the addition thereto of methyl ethyl ketone. The inhibitor was used in an amount corresponding to about 2 c. c. of ketone per liter of ether stabilized. The sample bottles were closed with stoppers provided with capillary tubes to permit the contents of the bottles to have access to the atmosphere, and the bottles stored in a dark cabinet for six months. At the end of this time the contents of the bottles were analyzed to determine the amount of peroxide formed.

The peroxide was determined as follows: 2 c. c.

of the ether were mixed with 10 c. c. of alcoholic potassium iodide solution, 2.5 c. c. of conc. acetic acid added, and the liberated iodine titrated with a N/20 sodium thiosulphate solution. When a 2 c. c. sample of the ether is taken, each c. c. of thiosulphate solution is equivalent to 0.00625 mol. of peroxide oxygen per liter of ether.

The results of the analyses are shown in the following table:

| Ether | Inhibitor | C. c. N/20 thiosulphate /2 c. c. ether | |
|---|---|---|---|
| | | Initial titration | Titration after 6 months |
| Ethyl tertiary butyl | None | 0.10 | 0.60 |
| Do | Methyl ethyl ketone | 0.10 | 0.08 |

These results show that while a considerable amount of peroxide was formed in the untreated sample, there was practically no peroxide formed in the treated sample.

Example II

Four samples of about the same volume were drawn from the same stock of ethyl tertiary butyl ether and placed in sample bottles as described in Example I. One of the samples was left untreated to serve as a blank. The other samples were stabilized with various carbonylic compounds as recited in the table below. In the case of salicylic acid, the inhibitor was used in an amount corresponding to about 0.004 mol. of the carbonylic compound per liter of ether. Acetone and methyl-ethyl ketone were used in an amount corresponding to about 2 c. c. of the ketone per liter of ether. The samples were stored in a dark cabinet for 12 months. At the end of this time the peroxide content of the various samples was determined by the method described in Example I. The results were as follows:

| Ether | Inhibitor | C. c. N/20 thiosulphate / 2 c. c. ether | | Atoms of peroxide oxygen per liter of ether after 12 months |
|---|---|---|---|---|
| | | Initial titration | Titration after 12 months | |
| Ethyl tertiary butyl | None | 0.10 | 5.50 | 0.07 |
| Do | Acetone | 0.10 | 2.00 | 0.02 |
| Do | Salicylic acid | 0.10 | 0.35 | |
| Do | Methyl ethyl ketone | 0.10 | 0.20 | |

It is seen from the above results that all of the carbonylic compounds used were effective in inhibiting peroxide formation in ethyl tertiary butyl ether.

Example III

Two samples of 200 c. c. each of the same stock of ethyl tertiary amyl ether were placed in tin cans. The contents of one of the cans was stabilized against peroxide formation by the addition thereto of about 0.10 gm. of salicylic acid. The cans were stoppered and stored for 96 days. At the end of this time the peroxide content of each sample was determined.

The untreated sample contained 0.32 gm. of peroxide oxygen per liter of ether, while the sample to which salicylic acid had been added was found to be free of peroxide.

Example IV

The following table shows the effectiveness of salicylic acid in inhibiting peroxide formation in ethyl tertiary amyl ether stored in metal or glass containers.

| Samples | Grams peroxide oxygen/liter ether | |
|---|---|---|
| | After 3 months | After 7 months |
| Stored in tin cans: | | |
| 200 c. c. ether—no inhibitor | 0.32 | 1.04 |
| 200 c. c. ether+0.1 gm. salicylic acid | 0.01 | 0.02 |
| Stored in glass: | | |
| 100 c. c. ether—no inhibitor | | 1.28 |
| 100 c. c. ether+0.05 gm. salicylic acid | | 0.01 |

Example V

Two samples of 200 c. c. each of the same stock of freshly prepared diisopropyl ether were placed in tin cans. One of the samples was stabilized against peroxide formation by the addition thereto of about 0.1 gm. of salicyclic acid. The other sample was untreated. The cans were closed and stored for three months. At the end of this time the peroxide content of each sample was determined. The untreated sample contained 2.14 gm. of peroxide oxygen per liter of ether, while the stabilized sample was substantially free of peroxide.

Salicylic acid also inhibited peroxide formation in diisopropyl ether stored in glass bottles for a period of 10 months.

While I have described my invention in a detailed manner and provided examples illustrating modes of executing the same, it is to be understood that modifications may be made and that no limitations other than those imposed by the scope of the appended claims are intended.

This application is a division of my copending application, Serial No. 96,816, filed August 19, 1936.

I claim as my invention:

1. A composition of matter stabilized against peroxide formation which comprises an aliphatic mixed ether and a stabilizing amount of a carbonylic compound selected from the group consisting of acetone, methyl ethyl ketone and salicylic acid.

2. A composition of matter stabilized against peroxide formation which comprises an ethyl butyl ether and a stabilizing amount of a carbonylic compound selected from the group consisting of acetone, methyl ethyl ketone and salicylic acid.

3. A composition of matter stabilized against peroxide formation which comprises an ethyl propyl ether and a stabilizing amount of a carbonylic compound selected from the group consisting of acetone, methyl ethyl ketone and salicylic acid.

4. A composition of matter stabilized against peroxide formation which comprises an ethyl amyl ether and a stabilizing amount of a carbonylic compound selected from the group consisting of acetone, methyl ethyl ketone and salicylic acid.

5. A composition of matter stabilized against peroxide formation which comprises an aliphatic mixed ether of the group consisting of ethyl tertiary butyl ether and ethyl tertiary amyl ether and a stabilizing amount of a carbonylic compound selected from the group consisting of acetone, methyl ethyl ketone and salicylic acid.

6. A composition of matter stabilized against peroxide formation which comprises an aliphatic mixed ether of the group consisting of ethyl tertiary butyl ether and ethyl tertiary amyl ether and a stabilizing amount of salicylic acid.

7. A composition of matter stabilized against peroxide formation which comprises ethyl tertiary butyl ether and a stabilizing amount of a carbonylic compound selected from the group consisting of acetone, methyl ethyl ketone and salicylic acid.

8. A composition of matter stabilized against peroxide formation which comprises ethyl tertiary amyl ether and a stabilizing amount of a carbonylic compound selected from the group consisting of acetone, methyl ethyl ketone and salicylic acid.

9. A composition of matter stabilized against peroxide formation which comprises ethyl tertiary butyl ether and a stabilizing amount of methyl ethyl ketone.

10. A composition of matter stabilized against peroxide formation which comprises ethyl tertiary amyl ether and a stabilizing amount of salicylic acid.

THEODORE EVANS.